US012755178B2

(12) United States Patent
Kim et al.

(10) Patent No.: US 12,755,178 B2
(45) Date of Patent: Oct. 6, 2026

(54) QUANTUM FEDERATED LEARNING SYSTEM AND METHOD

(71) Applicant: KOREA UNIVERSITY RESEARCH AND BUSINESS FOUNDATION, Seoul (KR)

(72) Inventors: Joongheon Kim, Seoul (KR); Won Joon Yun, Seoul (KR); Soyi Jung, Seoul (KR); Jae pyoung Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 571 days.

(21) Appl. No.: 18/355,249

(22) Filed: Jul. 19, 2023

(65) Prior Publication Data

US 2024/0177039 A1 May 30, 2024

(30) Foreign Application Priority Data

Nov. 23, 2022 (KR) ........................ 10-2022-0158284

(51) Int. Cl.
*G06N 10/20* (2022.01)
*G06N 3/04* (2023.01)

(52) U.S. Cl.
CPC ............... *G06N 10/20* (2022.01); *G06N 3/04* (2013.01)

(58) Field of Classification Search
CPC .......... G06N 10/20; G06N 3/04; G06N 3/045; G06N 3/08; G06N 10/60; B82Y 10/00
USPC ........................................................... 714/748
See application file for complete search history.

(56) References Cited

U.S. PATENT DOCUMENTS

| | | | | |
|---|---|---|---|---|
| 11,615,329 B2 * | 3/2023 | Wang | ..................... | G06N 10/00 706/46 |
| 11,645,568 B2 * | 5/2023 | Chen | ..................... | G06N 10/20 703/19 |
| 2020/0169396 A1 | 5/2020 | Neven et al. | | |
| 2021/0049498 A1 | 2/2021 | Liu et al. | | |
| 2022/0215967 A1 | 7/2022 | Zhao et al. | | |
| 2025/0356241 A1 * | 11/2025 | Chiaro | ................... | G06N 10/60 |

FOREIGN PATENT DOCUMENTS

| | | |
|---|---|---|
| KR | 10-2020-0097787 A | 8/2020 |
| KR | 10-2402314 B1 | 5/2022 |

* cited by examiner

*Primary Examiner* — James C Kerveros
(74) *Attorney, Agent, or Firm* — NSIP Law

(57) ABSTRACT

The present invention relates to a quantum federated learning system that performs federated learning on the basis of at least one observation value input from a single-hop offloading environment, and the system includes: a global server for initializing parameters of a quantum slimmable neural network (QSNN) model and transmitting the initialized quantum slimmable neural network model to at least one local device; and the at least one local device for inputting the at least one observation value into the initialized quantum slimmable neural network model to train the quantum slimmable neural network model, and transmitting the parameters of the trained quantum slimmable neural network model to the global server side. Through the system, the environmental epidemiology problems of the federated learning performed in conventional computing, such as communication channel conditions and energy limitations over time can be solved.

10 Claims, 5 Drawing Sheets

(a) (b) (c)

QUANTUM FEDERATED LEARNING SYSTEM AND METHOD

CROSS REFERENCE TO RELATED APPLICATION

This application claims the benefit of, and priority under 35 USC § 119(a) to, Korean Patent Application No. 10-2022-0158284, filed on Nov. 23, 2022, the entire disclosure of which is incorporated herein by reference.

BACKGROUND OF THE INVENTION

Field of the Invention

The present invention relates to a quantum federated learning system and method, and more specifically, to a quantum federated learning system and method, which performs federated learning using a device and server including a quantum circuit.

Background of the Related Art

Federated learning performed in conventional computing is a machine learning technique in which a plurality of terminals and one server cooperate to learn a global model. Here, the terminal may be, for example, an IoT device, a smart phone, or the like.

Such conventional federated learning may overcome lack of learning samples for learning a limited amount of local data.

In addition, in the conventional federated learning, efficiency of learning is improved when the number of wirelessly connected terminals, i.e., heterogeneous devices, increases.

However, since the heterogeneous devices have a different level of available energy, low-energy devices with relatively low available energy may execute a local model of a small width, whereas high-energy devices with high available energy may execute a local model of a large width.

Accordingly, the federated learning has a problem in that local models with a small or large width may not be learned since only local models of the same architecture can be aggregated.

In addition, although methods of grouping (clustering) the learning are proposed in the conventional federated learning to reduce the non-independent and identically distributed (non-IID) problem generated due to sparsity and imbalance of data, there is a problem in this case in that accuracy is lowered since the federated learning is simultaneously performed for a plurality of terminal groups with reduced learning samples.

Although a method using a Slimmable Neural Network (SNN) model capable of controlling the width of an artificial neural network is developed in the conventional federated learning to solve this problem, it has a problem in that additional communication and energy cost are required to examine the channel state that varies according to time and location due to random fading and mobility according to the environment.

Therefore, research and development of a technique that solves environmental epidemiology problems such as communication channel conditions and energy limitations over time is required.

PRIOR ART

Prior Patent Publication (Patent Publication 1) (KR) Patent Publication No. 10-2020-0097787

SUMMARY OF THE INVENTION

Therefore, the present invention has been made in view of the above problems, and it is an object of the present invention to provide a quantum federated learning system and method, which generates a global model as a device, which include a model based on a learnable quantum circuit, learns values according to a single-hop offloading environment, and transfers parameters according to the learning to a server.

A quantum federated learning system according to an embodiment of the present invention for accomplishing the above object is a quantum federated learning system that performs federated learning on the basis of at least one observation value input from a single-hop offloading environment, and the system comprises: a global server for initializing parameters of a quantum slimmable neural network (QSNN) model and transmitting the initialized quantum slimmable neural network model to at least one local device; and the at least one local device for inputting the at least one observation value into the initialized quantum slimmable neural network model to train the quantum slimmable neural network model, and transmitting the parameters of the trained quantum slimmable neural network model to the global server side.

Here, the quantum slimmable neural network model may include: a state encoder unit for calculating an angle along each axis by mapping the at least one observation value to a three-dimensional sphere; a quantum circuit unit for mapping the angle along each axis to a base layer, and overlapping the mapped base layer through a controlled X (CX) gate; and a measurement unit for measuring an axis value by iteratively projecting the overlapped base layer on a z-axis plane.

In addition, the quantum circuit unit may update an angle parameter of the base layer through angle learning based on the angle along each axis converted into a quantum state, and the measurement unit may update an axis parameter through local axis learning based on the updated angle parameter of the base layer.

In relation thereto, when update of the quantum slimmable neural network model is completed, the at least one local device may transmit the parameters of the updated quantum slimmable neural network model to the global model, and transmit any one or more among the angle parameter and the axis parameter in consideration of a channel state of the single-hop offloading environment.

Therefore, the global server may combine the angle parameter and the axis parameter transmitted from the at least one local device, train and update the global side quantum slimmable neural network model on the basis of the combined angle parameter and axis parameter, and retransmit the global side quantum slimmable neural network model to the at least one local device.

Meanwhile, a quantum federated learning method according to another embodiment of the present invention for accomplishing the above object is a quantum federated learning method executed in a quantum federated learning system that performs federated learning, and the method comprises the steps of: initializing parameters of a quantum slimmable neural network (QSNN) model and transmitting the initialized quantum slimmable neural network model to at least one local device, by a global server; receiving at least one observation value from a single-hop offloading environment, the at least one local device; and inputting the at least one observation value into the initialized quantum slimmable neural network model to train the quantum slimmable neural network model, and transmitting the parameters of the trained quantum slimmable neural network model to the global server side, by the at least one local device.

Here, the quantum slimmable neural network model may include: a state encoder unit for calculating an angle along each axis by mapping the at least one observation value to a three-dimensional sphere; a quantum circuit unit for mapping the angle along each axis to a base layer, and overlapping the mapped base layer through a controlled X (CX) gate; and a measurement unit for measuring an axis value by iteratively projecting the overlapped base layer on a z-axis plane.

In addition, the quantum circuit unit may update an angle parameter of the base layer through angle learning based on the angle along each axis converted into a quantum state, and the measurement unit may update an axis parameter through local axis learning based on the updated angle parameter of the base layer.

In relation thereto, the step of transmitting the updated parameters of the quantum slimmable neural network model to the global server side, by the at least one local device, may include, when update of the quantum slimmable neural network model is completed, transmitting the parameters of the updated quantum slimmable neural network model to the global server side, and transmitting any one or more among the angle parameter and the axis parameter in consideration of a channel state of the single-hop offloading environment.

Therefore, the quantum federated learning method may further comprise the steps of: combining the angle parameter and the axis parameter received from the at least one local device, by the global server; training and updating the global side quantum slimmable neural network model on the basis of the combined angle parameter and axis parameter, by the global server; and retransmitting the global side quantum slimmable neural network model to the at least one local device, by the global server.

DETAILED DESCRIPTION OF THE PREFERRED EMBODIMENT

Figure 1:
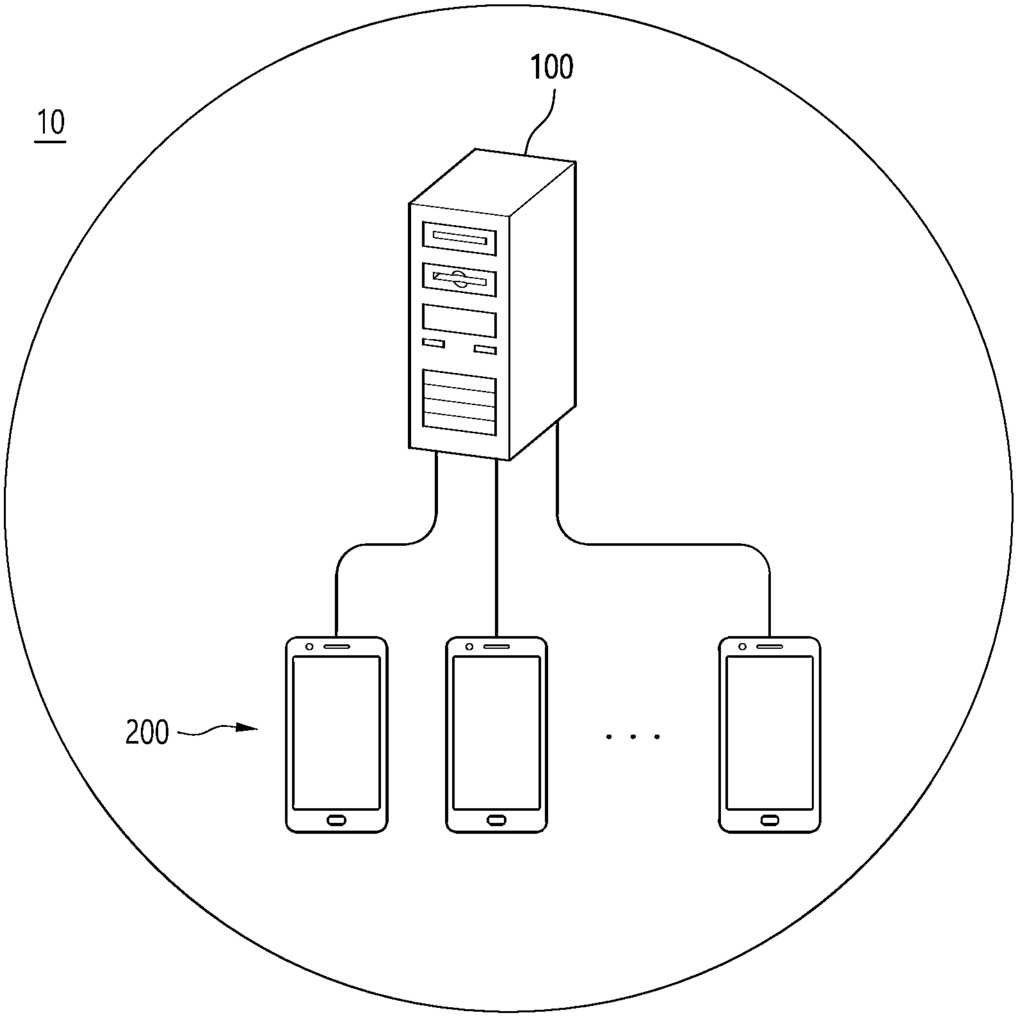
FIG. 1 is a view showing a quantum federated learning system according to an embodiment of the present invention.

The detailed description of the present invention described below refers to accompanying drawings which show specific embodiments in which the present invention may be practiced as an example. These embodiments are described in detail to be sufficient for those skilled in the art to embody the present invention. It should be understood that various embodiments of the present invention are not necessarily mutually exclusive although they are different from each other. For example, specific shapes, structures, and characteristics described herein may be implemented as different embodiments without departing from the spirit and scope of the present invention. In addition, it should be understood that the locations or arrangements of individual components within each disclosed embodiment may be changed without departing from the spirit and scope of the present invention. Accordingly, the detailed description described below is not to be taken in a limiting sense, and the scope of the present invention, if properly described, is limited only by the appended claims, together with all the scopes equivalent to those claimed in the claims. Like reference numerals in the drawings indicate the same or similar functions throughout various aspects.

Components according to the present invention are components defined not by physical classification but by functional classification, and may be defined by the functions performed by each component. Each component may be implemented as hardware or program codes and processing units that perform respective functions, and functions of two or more components may be implemented to be included in one component. Therefore, the names given to the components in the following embodiments are not to physically distinguish each component, but to imply a representative function performed by each component, and it should be noted that the technical spirit of the present invention is not limited by the names of the components.

Hereinafter, preferred embodiments of the present invention will be described in more detail with reference to the drawings.

Figure 2:
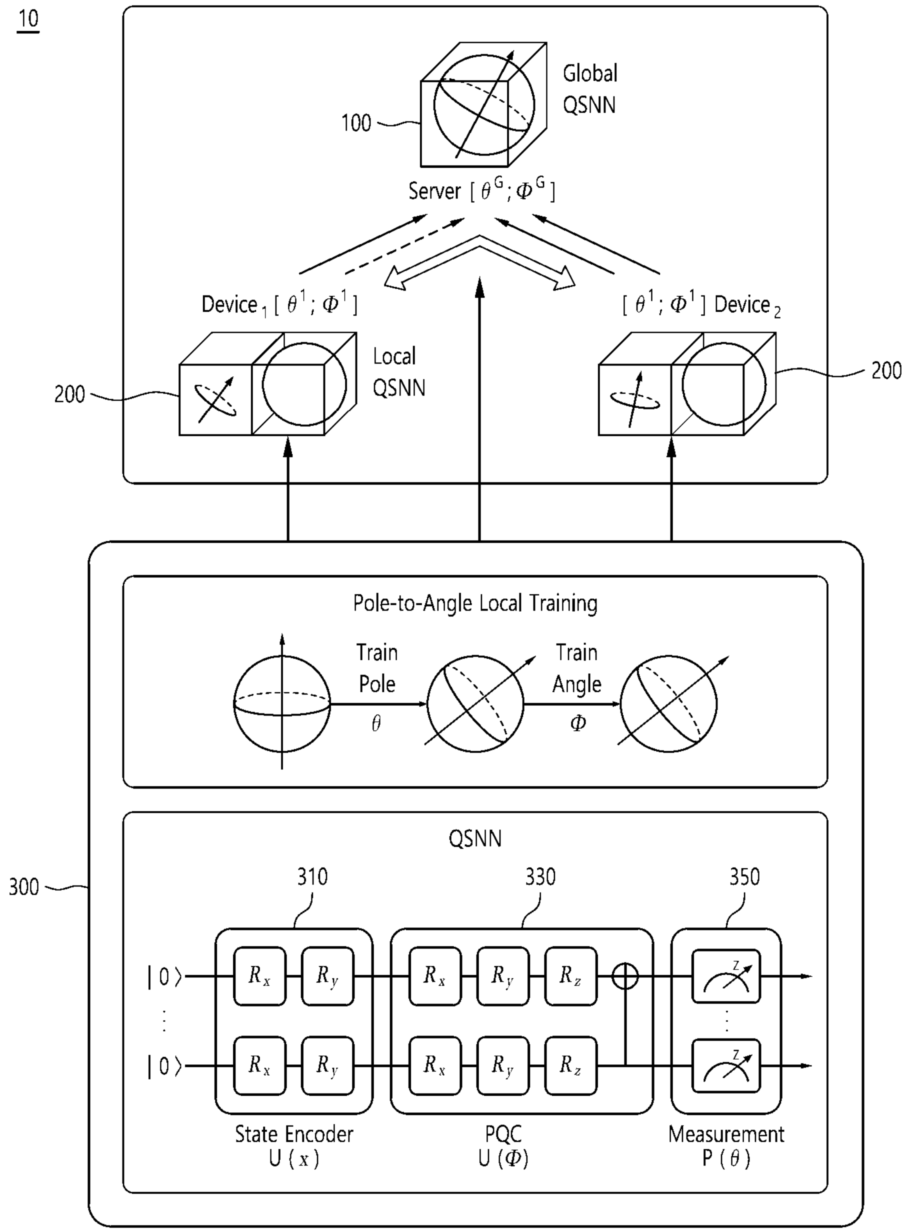
FIG. 2 is a view showing the quantum federated learning system of FIG. 1 in detail.
Figure 3:
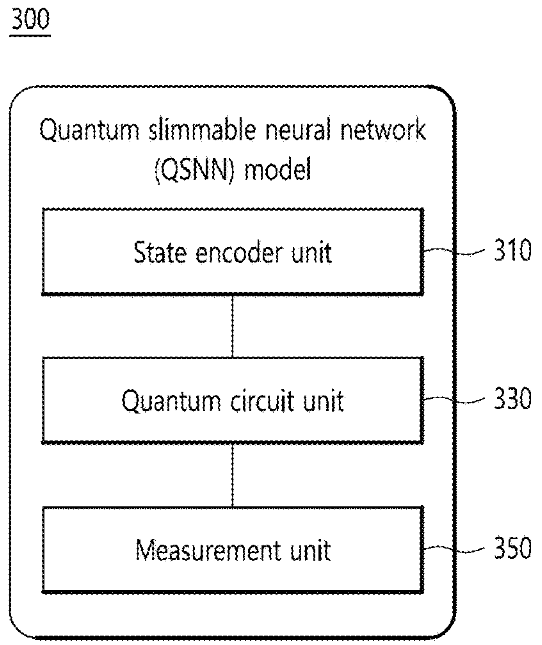
FIG. 3 is a block diagram showing the quantum slimmable neural network model of FIG. 1.

FIG. 1 is a view showing a quantum federated learning system according to an embodiment of the present invention, FIG. 2 is a view showing the quantum federated learning system of FIG. 1 in detail, and FIG. 3 is a block diagram showing the quantum slimmable neural network model of FIG. 1.

A quantum federated learning system (hereinafter, a system) 10 according to the present invention performs federated learning on the basis of at least one observation value received from a single-hop offloading environment.

Accordingly, referring to FIG. 1, the system 10 is formed of a global server 100 and at least one local device 200. In addition, software (application) for performing the quantum federated learning method may be installed and executed in the global server 100 and the at least one local device 200 constituting the system 10.

Here, the global server 100 may execute or manufacture various software based on an operating system (OS), i.e., a system. The operating system is a system program that allows the software to use hardware of the apparatus, and may include all computer operating systems such as mobile computer operating systems such as Android OS, iOS, Windows mobile OS, Bada OS, Symbian OS, Blackberry OS, and the like, Windows-based, Linux-based, Unix-based, MAC, AIX, and HP-UX operating systems.

In addition, the at least one local device 200 may be provided as a wireless communication device, an unmanned aerial vehicle (UAV), or the like that ensure portability and mobility, and although all types of handheld-based wireless communication devices may be included, such as Personal Communication Systems (PCS), Global System for Mobile communications (GSM), Personal Digital Cellular (PDC), Personal Handyphone System (PHS), Personal Digital Assistant (PDA), International Mobile Telecommunication-2000 (IMT-2000), Code Division Multiple Access-2000 (CDMA-2000), W-Code Division Multiple Access (W-CDMA), Wireless Broadband Internet (Wibro) terminal, smartphone, smart pad, tablet PC, Virtual Reality (VR) device, Head Mounted Display (HMD), and the like, it is not limited thereto.

Referring to FIG. 2, the global server 100 initializes parameters of a quantum slimmable neural network (QSNN) model 300 and transmits the initialized quantum slimmable neural network model 300 to at least one local device.

Therefore, at least one local device 200 inputs at least one observation value into the initialized quantum slimmable neural network model 300 to train the quantum slimmable neural network model 300.

In relation thereto, referring to FIG. 3, the quantum slimmable neural network model 300 includes a state encoder unit 310, a quantum circuit unit 330, and a measurement unit 350, and may learn the at least one observation value input from the local device 200 and update parameters thereof.

First, the state encoder unit 310 may calculate an angle along each axis by mapping at least one observation value input from the local device 200 to a three-dimensional sphere.

Here, the three-dimensional sphere is a three-dimensional sphere named Bloch sphere, and is used to encode and calculate the input value as angles of the x-axis, y-axis, and z-axis of a qubit state.

Accordingly, the state encoder unit 310 may calculate an angle along each axis as a qubit state by mapping the observation value to a three-dimensional sphere coordinate system having an initial angle set to 0°.

Here, the qubit state is a quantum state.

The quantum circuit unit 330 may map the angle along each axis to a base layer, and overlap the mapped base layer 131 through a controlled X (CX) gate.

Here, the quantum circuit unit 330 is a quantum circuit designed to imitate the calculation procedure of an artificial neural network used in conventional computing, and may provide users with performance higher than that of conventional artificial neural networks by overlapping and using a small number of parameters in a quantum state.

The quantum circuit unit 330 may use a base layer having a learnable angle parameter and a CX gate that overlaps the base layer.

Here, the base layer is a single layer including a plurality of rotation gates rotating around a corresponding axis in a three-dimensional sphere, and may include an Rx gate, an Ry gate, and an Rz gate each having a learnable angle parameter.

In addition, the CX gate is a parameterized rotation gate, which overlaps a plurality of rotation gates to convert the probability amplitudes of a quantum state appearing on the x-axis, y-axis, and z-axis, and entangles the converted probability amplitude of each axis.

The quantum circuit unit 330 using the base layer and CX gate may update the learnable angle parameter of the base layer through angle learning based on the angle along each axis converted into a quantum state.

Here, as the quantum circuit unit performs angle learning that updates the learnable parameter of the base layer, it may interact with different single-hop offloading environments in which at least one local device 200 exists.

In addition, the quantum circuit unit 330 may add normalized noise along each axis to each angle parameter in order to solve a problem generated by the limited size of qubit in a quantum network or a single-hop offloading environment.

More specifically, the quantum circuit unit 330 may perform angle learning for updating the learnable angle parameter of the base layer using an angle-pole optimization technique on the basis of each axis converted into a quantum state.

Here, the angle-pole optimization technique is a technique of updating by further adding noise along each axis to the angle parameter of the base layer 131 in the process of updating the learnable parameters of the base layer according to the angle along each axis converted into a quantum state.

In relation thereto, the noise along each axis is noise that affects the learnable parameters, the projection matrix, and the meta-quantum network of the base layer, and may be used to calculate a loss function as it is formed of too few qubits to affect the size.

More specifically, the quantum circuit unit 330 may add angle and noise along each axis to the angle parameter of the base layer using an angle-pole optimization technique, and calculate a difference value between the parameter of the base layer before the noise is added and the parameter of the base layer to which the noise is added.

Here, the quantum circuit unit 330 may calculate a loss gradient value as a temporary difference value and update the learnable parameters of the base layer through the calculated loss gradient value.

The loss gradient value may be defined as shown in [Equation 1].

[Equation 1]

$$\mathcal{L}(\phi; \theta + \tilde{\theta}, \varepsilon) = \frac{1}{n(\epsilon)} \sum_{<o,a,r,o'>} \left[r + Q(o', \text{argmax} a'; \phi', \theta) - Q(o, a; \phi, \theta + \tilde{\theta})\right]^2$$

Here, ϕ is a variable defining an angle parameter, θ is a variable defining an axis parameter, $\tilde{\theta}$ a variable for a noise value added to the learnable parameters of the base layer, and ε is a variable defining the learning data set.

Learning data ε includes <o, a, r, o'> respectively defining current observation information, behavior information, reward information, and observation information of the next state.

In addition, a' and ϕ' included in Q(o', argmaxa'; ϕ', θ) are variables defining behavior information in the next state and target parameters configuring a target network, and Q(o', argmaxa'; ϕ', θ) acquires a' indicating the highest behavior value in the next observation information.

In addition, (o, a; ϕ, θ+$\tilde{\theta}$) is a variable defining a behavior value function network that calculates a behavior value for current behavior a sampled from the current state information.

Accordingly, the quantum circuit unit 330 may update the learnable angle parameter of the base layer, and map the observation value and a corresponding angle along each axis to be overlapped on the three-dimensional sphere surface on the basis of the updated angle parameter.

The measurement unit 350 may measure an axis value by iteratively projecting the overlapped base layer on the z-axis plane.

To this end, the measurement unit 350 may update the axis parameter through local axis learning based on the angle parameter of the base layer.

Here, the axis parameter is a learnable axis parameter formed on a three-dimensional sphere, and may be initialized to 0 in advance under the control of the global server 100.

More specifically, the measurement unit 350 may perform local axis learning with the angle parameter of the base layer according to a preset algorithm method.

At this point, although the preset algorithm method may be the Fedavg algorithm, it is not limited thereto.

Accordingly, the measurement unit 350 may calculate a loss function, i.e., a gradient, to be used for local axis learning.

The gradient may be defined as shown in [Equation 2].

$$\tilde{\phi} \leftarrow \phi - \eta \nabla_{\phi} \mathcal{L}(\phi) \qquad \text{[Equation 2]}$$

Here, $\eta$ is a variable defining the learning rate, and $\nabla_{\phi} \mathcal{L}(\phi)$ is a variable defining the gradient. In addition, the gradient may be calculated according to the parameter movement rule.

Accordingly, the measurement unit 350 may update the axis parameter and rotate the learnable axis formed on the three-dimensional sphere on the basis of the updated axis parameter.

In addition, the measurement unit 350 may measure the learnable axis rotated based on the updated axis parameter as an axis value on the basis of the overlapped base layer.

The angle learning in the quantum circuit unit 330 and the local axis learning in the measurement unit 350 may be operated as shown in [Table 1].

TABLE 1

| Algorithm 1: Pole-to-Angle Local-QSNN Train |
|---|
| Notation. $\mathcal{D}$ : local trainset, $x_i$: data of i-th batch, $y_i$: label of i-th batch,<br>$\eta_l$: learning rate in l-th iterations.; |
| Initialization. local-QNN parameters, $\phi$, $\theta$; |
| for l = {1, 2, . . . , L} do |
| │ for $(x_i, y_i) \in \mathcal{D}$ do |
| │ │ $\hat{y}_i \leftarrow$ QSNN($x_i$; $\phi$, $\theta$) // $\hat{y}_i$: logits; |
| │ │ Calculate loss, $\mathcal{L}(\phi, \theta, (x_i, y_i))$; |
| └ └ Update pole, $\theta \leftarrow \theta - \eta_i \nabla_{\theta} \mathcal{L}(\phi, \theta, (x_i, y_i))$; |
| $\tilde{\theta} \leftarrow \theta$ ; |
| for l = {1, 2, . . . , [L} do |
| │ for $(x_i, y_i) \in \mathcal{D}$ do |
| │ │ $\hat{y}_i \leftarrow$ QSNN($x_i$; $\phi$, $\theta$); |
| │ │ Calculate loss, $\mathcal{L}(\phi, \theta, (x_i, y_i))$; |
| └ └ Update angle, $\phi \leftarrow \phi - \eta_i \nabla_{\phi} \mathcal{L}(\phi, \tilde{\theta}, (x_i, y_i))$; |
| $\tilde{\phi} \leftarrow \phi$; |

In addition, the angle parameter and the axis parameter updated by the quantum circuit unit 330 and the measurement unit 350 may be defined as shown in [Equation 3].

$$\begin{bmatrix} \tilde{\theta}^n \\ \tilde{\phi}^n \end{bmatrix} \leftarrow \begin{bmatrix} \theta^n \\ \tilde{\phi}^n \end{bmatrix} - \eta_t \begin{bmatrix} \sum_{l=1}^{L} \nabla_{\theta_l^n} \mathcal{L}(\phi^n, \theta_l^n) \\ \sum_{l=1}^{L} \nabla_{\theta_l^n} \mathcal{L}(\phi_l^n, \theta^n) \end{bmatrix} \qquad \text{[Equation 3]}$$

Here, $\eta_t$ is a variable defining a learning rate at time t, and the quantum circuit unit 330 and the measurement unit 350 perform iterative learning according to a preset number of times shown in Algorithm 1 to update the angle and axis parameters as an angle parameter and an axis parameter having a value of $[\tilde{\theta}^n, \tilde{\phi}^n]$.

Accordingly, at least one local device 200 transmits parameters of the trained quantum slimmable neural network model 300 to the global server 100 side. Here, the parameters of the trained quantum slimmable neural network model 300 are the angle parameter and the axis parameter updated through the iterative learning.

More specifically, when update of the quantum slimmable neural network model 300 is completed, at least one local device 200 transmits the parameters of the updated quantum slimmable neural network model 300 to the global server 100 side, and may transmit any one or more among the angle parameter and the axis parameter in consideration of a channel state of the single-hop offloading environment.

Here, at least one local device 200 may calculate a reception throughput R of the bandwidth in a channel using the Shannon's channel capacity formula defined as shown in [Equation 4].

$$R = W \log_2(1 + SNL); \text{ (bits/sec)} \qquad \text{[Equation 4]}$$

Here, R is a variable defining a reception throughput of bandwidth W, and SNL is a signal-to-noise ratio.

Accordingly, at least one local device 200 may calculate the SNR using the SNR formula defined as shown in [Equation 5].

$$SNL = \frac{\chi d - \beta_P}{\sigma^2} \qquad \text{[Equation 5]}$$

Here, $\chi$ is a variable defining Rayleigh fading, which is a statistical model for the effect of the propagation environment of radio signals, d is a variable defining a distance between a transmitter and a receiver, $\beta$ is a variable defining the path loss index, and P is transmission power, and $\sigma^2$ is noise power.

In relation thereto, when the updated angle parameter and axis parameter to be transmitted to the global server 100 are encoded at a code rate u, and the reception throughput R of the bandwidth W is higher than the code rate u, i.e., it satisfies $$\mathbb{1}(R^n \geq u_{th}^{whole}),$$

the transmitter, i.e., at least one local device 200, determines that the channel state is good and may transmit both the updated angle parameter and axis parameter to the global server 100 side.

In addition, when the reception throughput R of the bandwidth W is lower than the code rate u, i.e., it satisfies $$\mathbb{1}(u_{th}^{pole} \leq R^n < u_{th}^{whole},$$

at least one local device 200 determines that the channel state is not good and may transmit only the updated angle parameter to the global server 100 side.

According thereto, loss of packets used in the transmission of the updated parameters can be minimized.

Meanwhile, the global server 100 may combine the angle parameter and the axis parameter transmitted from at least one local device 200.

In addition, the global server 100 may train and update the global side quantum slimmable neural network model 300 on the basis of the combined angle parameter and axis parameter.

Here, the global server 100 may train the global side quantum slimmable neural network model 300 through the angle learning and axis learning performed by at least one local device 200 in the method described above.

In addition, the global server 100 may perform the axis learning first of all before the angle learning according to the number of axis parameters transmitted by at least one local device 200 according to the channel state in a single-hop offloading environment.

Here, since whether or not to transmit the updated axis parameter is determined according to the channel state, the global server 100 may perform axis learning first as the number of the updated axis parameters is smaller than that of the updated angle parameter.

The process of training and updating the global side quantum slimmable neural network model 300 by the global server 100 described above may be performed as shown in shown [Table 2].

TABLE 2

| Algorithm 2: SlimQFL |
|---|
| Notation. $\tilde{\theta}^n$, $\tilde{\phi}^n$: n-th device's pole/angle parameters. $\tilde{\theta}^G$, $\tilde{\phi}^G$: pole/angle parameters of server-side QSNN: |
| Initialization. $\forall\ c_\theta^n, c_\phi^n \leftarrow 0$; |
| for n = {1, . . . , N} do |
| \| Sample $\chi^n \sim \exp(1)$: |
| \| if $R^n \geq u_{th}^{whole}$ then |
| \| \| Transmitt pole/angle paramters, $(\tilde{\theta}^n, \tilde{\phi}^n)$: |
| \| └ $c_\theta^n, c_\phi^n \leftarrow 1$; |
| \| else if $R^n \geq u_{th}^{pole}$ then |
| \| \| Transmit angle parameters, $\tilde{\theta}^n$; |
| \| └ $c_\theta^n \leftarrow 1$; |
| └ |
| if $\sum_{n=1}^{N} c_\theta^n \neq 0$ and $\sum_{n=1}^{N} c_\phi^n \neq 0$ then |
| └ Update with (4); |

Here, the global server 100 may update the global side quantum slimmable neural network model 300 having the updated angle parameter and axis parameter as shown in [Equation 6] by performing axis learning and angle learning on the global side quantum slimmable neural network model 300 with initialized parameters according to the number of times preset in Algorithm 2.

$$\begin{bmatrix} \tilde{\theta}^G \\ \tilde{\phi}^G \end{bmatrix} \leftarrow \begin{bmatrix} \frac{1}{\sum_{n=1}^{N} c_\phi^n} \sum_{n=1}^{N} c_\phi^n \tilde{\phi}^n \\ \frac{1}{\sum_{n=1}^{N} c_\theta^n} \sum_{n=1}^{N} c_\theta^n \tilde{\theta}^n \end{bmatrix} \quad \text{[Equation 6]}$$

Here, the global server 100 may calculate an event of the angle parameter and the axis parameter received from at least one local device 200 using an indicator function $$(c_\phi^n, c_\theta^n),$$

and update the global side quantum slimmable neural network model 300 to have an axis parameter and an angle parameter $[\tilde{\phi}^G; \tilde{\theta}^G]$.

In addition, the global server 100 may retransmit the global side quantum slimmable neural network model 300 to at least one local device 200.

Here, the quantum slimmable neural network model 300 transmitted by the global server 100 is a global side quantum slimmable neural network model 300 updated by learning the angle parameter and the axis parameter transmitted from at least one local device 200.

Accordingly, when one or more different observation values are input according to different single-hop offloading environments, the at least one local device 200 may perform the above process on the basis of the at least one observation value.

In this way, the system 10 may solve the environmental epidemiology problems of the federated learning performed in conventional computing, such as communication channel conditions and energy limitations over time, by performing the federated learning performed in conventional computing using one global server 100, each having a quantum slimmable neural network model, and at least one local device 200.

Figure 4:
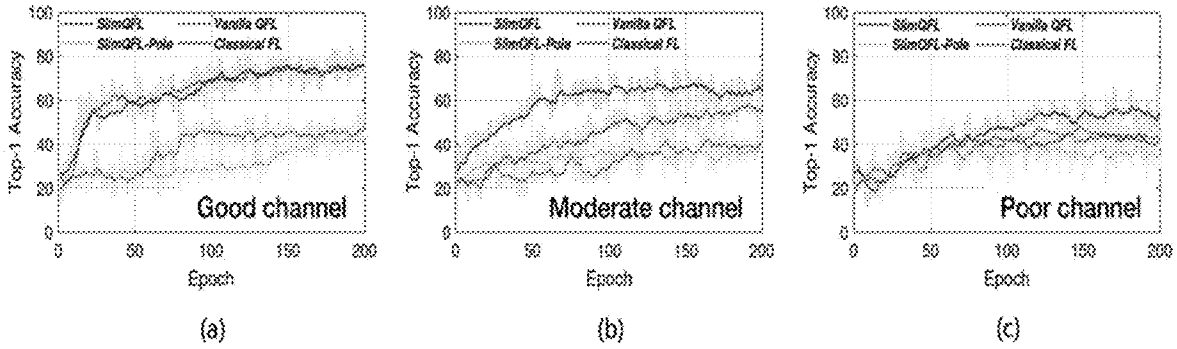
FIGS. 4 and 5 are views showing results of an experiment for confirming performance of a quantum federated learning system according to an embodiment of the present invention.

Meanwhile, FIG. 4 and are views showing results of an experiment for confirming performance of a quantum federated learning system according to an embodiment of the present invention.

In the experiment for confirming performance of a quantum federated learning system 10 according to the present invention (hereinafter, a system), accuracy of data output according to the channel state of a single-hop offload environment is measured by learning IID data independently and equally distributed in SlimQFL that is a system 10 according to the present invention, SlimQFL-pole that is a system performing only local axis learning based on axis parameter, Vanilla QFL that is a system performing only angle learning based on angle parameter, and Classical FL that is a federated learning system performed in conventional computing.

Since SlimQFL, SlimQFL-pole, and Vanilla QFL based on quantum computing are limited by the number of qubits in this experiment, they are trained by interpolating image data used for learning in a small size, i.e., in a size of 28×28 to 4×4, and for the sake of fair comparison, it is assumed that the Vanilla QFL also has a learnable axis parameter trained in the same way of the angle parameter, and more local devices are assigned to the Classical FL.

In addition, in this experiment, three channel state conditions of good, normal and bad are considered to confirm accuracy of the system 10 according to the present invention under various channel conditions.

FIG. 4 is a view showing a result of the experiment.

Referring to FIG. 4, it is confirmed that SlimQFL-pole shows low performance as the number of parameters, i.e., parameters used for learning, is small, but it can be confirmed that a high accuracy curve is shown when a learnable axis parameter is added.

On the other hand, accuracy of Vanilla QFL and Classical FL is confirmed to be lowered as the channel state is deteriorated, and it is confirmed that SlimQFL and SlimQFL-pole, which are systems 10 according to the present invention, maintain accuracy of a similar level, and it can be confirmed that SlimQFL, which is the system 10 according to the present invention, among them shows the highest accuracy.

In addition, although it is confirmed that SlimQFL-pole and Vanilla QFL, which use quantum computing, show better accuracy than Classical FL in a normal channel state environment, it can be confirmed that SlimQFL-pole and Vanilla QFL show accuracy lower than that of SlimQFL as they are trained with only a small number of parameters.

Through this, it can be confirmed that the system 10 according to the present invention has accuracy higher than that of a model that performs a process of learning only the axis parameter or angle parameter, as well as the federated learning performed in conventional computing.

On the other hand, in the experiment for confirming performance of the system 10 according to the present invention, the number of local devices 200, the number of times of learning, and the size of learning data in SlimQFL, which is the system 10 according to the present invention, are set differently to measure performance of the model.

Figure 5:
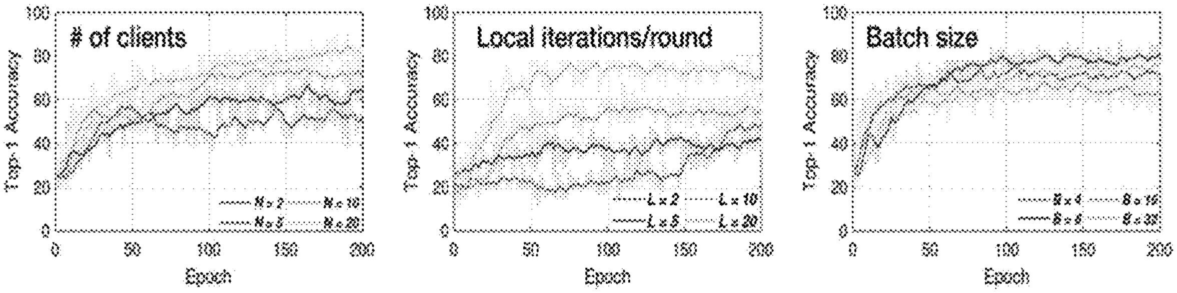

FIG. 5 is a view showing a result of the experiment.

Referring to FIG. 5(*a*), it can be confirmed that performance of SlimQFL, which is the system 10 according to the present invention, is improved as the number of local devices 200 increases.

Through the result of the experiment, it can be confirmed that the system 10 according to the present invention is affected by the number of local devices 200, and it can be confirmed that as the number of local devices 200 increases, the system 10 has further higher performance.

Referring to FIG. 5(*b*), it can be confirmed that performance of SlimQFL, which is the system 10 according to the present invention, is improved as the number of times of learning increases.

Here, although there is a problem in that the Fedavg algorithm learning performed in the system 10 according to the present invention shows higher performance when the number of iterations of learning is small, the performance is lowered when the number of iterations exceeds a specific threshold value, but it can be confirmed through the experiment result that the system 10 according to the present invention solves the problem.

Referring to FIG. 5(*c*), it can be confirmed that SlimQFL, which is the system 10 of the present invention, provides the lowest performance when it learns learning data having a size of 16×16 among the sizes of learning data, whereas it provides the highest performance with learning data having a size of 8×8.

Through the result of the experiment, it can be confirmed that the system 10 according to the present invention does not greatly affect the size of learning data, and there is no consistent relationship between the size of arranging the learning data and performance.

Figure 6:
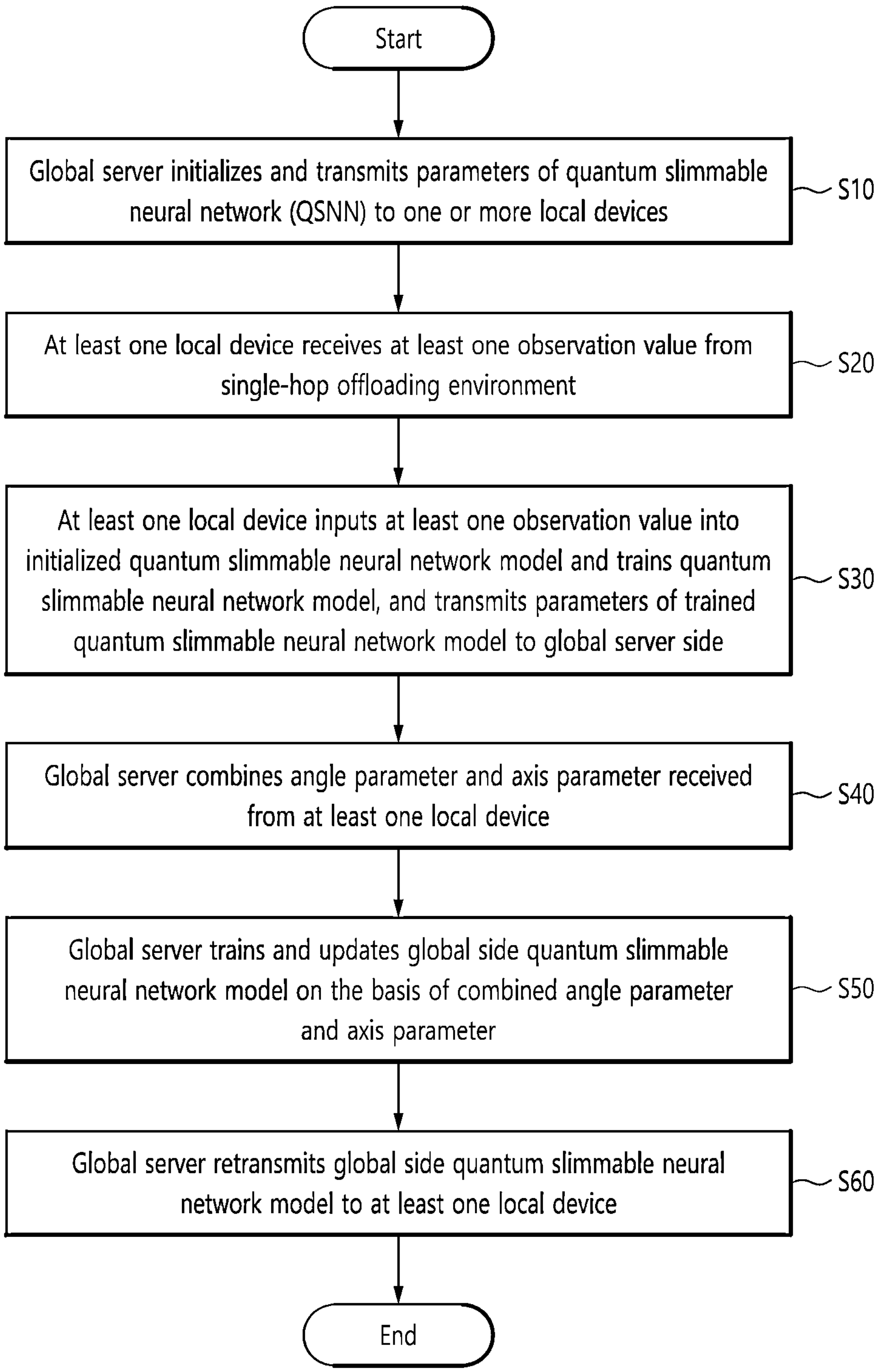
FIG. 6 is a flowchart illustrating a quantum federated learning method according to another embodiment of the present invention.

Meanwhile, FIG. 6 is a flowchart illustrating a quantum federated learning method according to another embodiment of the present invention, and the quantum federated learning method according to the present invention proceeds on the substantially same configuration as the quantum federated learning system 10 shown in FIGS. 1 to 3, the same reference numerals are given to the components the same as those of the quantum federated learning system 10 of FIGS. 1 to 3, and repeated description will be omitted.

Referring to FIG. 6, the quantum federated learning method according to the present invention is performed in a quantum federated learning system 10 including one global server 100 and at least one local device 200 (hereinafter, referred to as a system).

First, the global server 100 performs a step of initializing parameters of a quantum slimmable neural network (QSNN) model 300 and transmitting the initialized quantum slimmable neural network model 300 to at least one local device 200 (S10).

Thereafter, at least one local device 200 performs a step of receiving at least one observation value from a single-hop offloading environment (S20).

Then, at least one local device 200 performs a step of inputting at least one observation value into the initialized quantum slimmable neural network model 300 and training the quantum slimmable neural network model 300, and transmitting parameters of the trained quantum slimmable neural network model 300 to the global server 100 side (S300).

Here, the quantum slimmable neural network model 300 may include a state encoder unit 310 for calculating an angle along each axis by mapping at least one observation value to a three-dimensional sphere, a quantum circuit unit 330 for mapping the angle along each axis to a base layer, and overlapping the mapped base layer through a Controlled X (CX) gate, and a measurement unit 350 for measuring an axis value by iteratively projecting the overlapped base layer on the z-axis plane.

More specifically, the quantum circuit unit 330 may update the angle parameter of the base layer through angle learning based on the angle along each axis converted into a quantum state.

In addition, the measurement unit 350 may update the axis parameter through local axis learning based on the updated parameter of the base layer.

In relation thereto, the global server 100 may perform a step of combining the angle parameter and the axis parameter received from at least one local device 200 (S40).

Then, the global server 100 may perform a step of training and updating the global side quantum slimmable neural network model 300 on the basis of the combined angle parameter and axis parameter (S50).

Then, the global server 100 may perform a step of retransmitting the global side quantum slimmable neural network model 300 to at least one local device 200 (S60).

In this way, the system 10 may solve the environmental epidemiology problems of the federated learning performed in conventional computing, such as communication channel conditions and energy limitations over time, by performing a quantum federated learning method.

According to one aspect of the present invention described above, it is possible to provide users with a quantum federated learning system and method having improved performance compared to conventional federated learning even when learning is performed through a small number of parameters.

In addition, it is possible to solve the environmental epidemiology problems of the federated learning performed in conventional computing, such as communication channel conditions and energy limitations over time, by performing quantum federated learning according to a plurality of different environments.

Although various embodiments of the present invention have been shown and described above, the present invention is not limited to the specific embodiments described above, and of course, various modified embodiments are possible by those skilled in the art without departing from the gist of the present invention claimed in the claims, and these modified embodiments should not be individually understood from the technical spirit or prospect of the present invention.

DESCRIPTION OF SYMBOLS

10: Quantum federated learning system including dynamically adjustable device
100: Global server
200: At least one local device
300: Quantum slimmable neural network model
310: State encoder unit
330: Quantum circuit unit
350: Measurement unit

What is claimed is:

1. A quantum federated learning system that performs federated learning on the basis of at least one observation value input from a single-hop offloading environment, the system comprising:

a global server for initializing parameters of a quantum slimmable neural network (QSNN) model and transmitting the initialized quantum slimmable neural network model to at least one local device; and the at least one local device for inputting the at least one observation value into the initialized quantum slimmable neural network model to train the quantum slimmable neural network model, wherein the at least one local device determines a channel state of the single-hop offloading environment based on a calculated reception throughput, and transmits at least one of an updated angle parameter and an updated axis parameter of the trained quantum slimmable neural network model to the global server side in a differential manner according to the determined channel state to minimize packet loss.

2. The system according to claim 1, wherein the quantum slimmable neural network model includes:

a state encoder unit for calculating an angle along each axis by mapping the at least one observation value to a three-dimensional sphere;

a quantum circuit unit for mapping the angle along each axis to a base layer, and overlapping the mapped base layer through a controlled X (CX) gate; and a measurement unit for measuring an axis value by iteratively projecting the overlapped base layer on a z-axis plane.

3. The system according to claim 2, wherein the quantum circuit unit updates an angle parameter of the base layer through angle learning based on the angle along each axis converted into a quantum state, and the measurement unit updates an axis parameter through local axis learning based on the updated angle parameter of the base layer.

4. The system according to claim 1, wherein when update of the quantum slimmable neural network model is completed, the at least one local device calculates the reception throughput using Shannon's channel capacity formula and compares the calculated reception throughput to a threshold code rate to determine the channel state.

5. The system according to claim 4, wherein the global server combines the angle parameter and the axis parameter transmitted from the at least one local device, trains and updates the global side quantum slimmable neural network model on the basis of the combined angle parameter and axis parameter, and retransmits the global side quantum slimmable neural network model to the at least one local device.

6. A quantum federated learning method executed in a quantum federated learning system that performs federated learning, the method comprising the steps of:

initializing parameters of a quantum slimmable neural network (QSNN) model and transmitting the initialized quantum slimmable neural network model to at least one local device, by a global server;

receiving at least one observation value from a single-hop offloading environment, by the at least one local device;

inputting the at least one observation value into the initialized quantum slimmable neural network model to train the quantum slimmable neural network model, determining, by the at least one local device, a channel state of the single-hop offloading environment based on a calculated reception throughput; and transmitting the parameters of the trained quantum slimmable neural network model to the global server side, by the at least one local device, wherein the transmitting includes transmitting at least one of an updated angle parameter and an updated axis parameter in a differential manner according to the determined channel state.

7. The method according to claim 6, wherein the quantum slimmable neural network model includes:

a state encoder unit for calculating an angle along each axis by mapping the at least one observation value to a three-dimensional sphere;

a quantum circuit unit for mapping the angle along each axis to a base layer, and overlapping the mapped base layer through a controlled X (CX) gate; and a measurement unit for measuring an axis value by iteratively projecting the overlapped base layer on a z-axis plane.

8. The method according to claim 7, wherein the quantum circuit unit updates an angle parameter of the base layer through angle learning based on the angle along each axis converted into a quantum state, and the measurement unit updates an axis parameter through local axis learning based on the updated angle parameter of the base layer.

9. The method according to claim 8, wherein the step of transmitting the updated parameters further comprises determining the channel state by calculating the reception throughput using Shannon's channel capacity formula and comparing the calculated reception throughput to a threshold code rate.

10. The method according to claim 9, further comprising the steps of:

combining the angle parameter and the axis parameter received from the at least one local device, by the global server;

training and updating the global side quantum slimmable neural network model on the basis of the combined angle parameter and axis parameter, by the global server; and retransmitting the global side quantum slimmable neural network model to the at least one local device, by the global server.

* * * * *